No. 866,450. PATENTED SEPT. 17, 1907.
G. W. FERGUESON.
SUBSOILER ATTACHMENT FOR LISTER PLOWS.
APPLICATION FILED MAY 22, 1907.
2 SHEETS—SHEET 1.
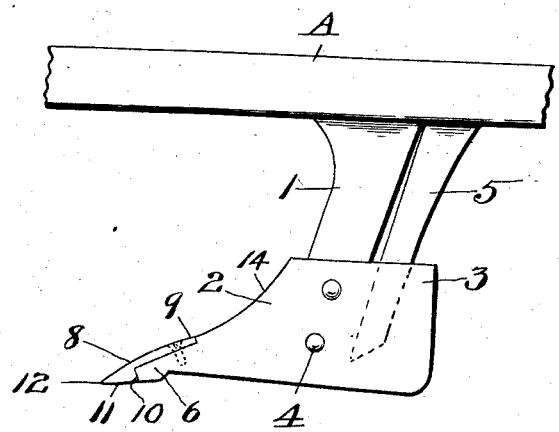
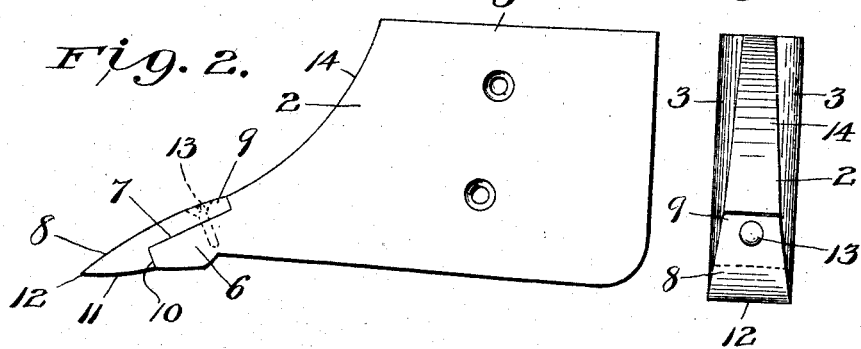

No. 866,450.  
PATENTED SEPT. 17, 1907.  
G. W. FERGUESON.  
SUBSOILER ATTACHMENT FOR LISTER PLOWS.  
APPLICATION FILED MAY 22, 1907.

2 SHEETS—SHEET 2.

Witnesses  
Jos. H. Blackwood  
W. O. Blackwood

Inventor  
George W. Fergueson  
By James K. Polk  
Attorney

UNITED STATES PATENT OFFICE.

GEORGE W. FERGUESON, OF LOGAN, KANSAS.

SUBSOILER ATTACHMENT FOR LISTER-PLOWS.

No. 866,450.   Specification of Letters Patent.   Patented Sept. 17, 1907.

Application filed May 22, 1907. Serial No. 375,031.

*To all whom it may concern:*

Be it known that I, GEORGE W. FERGUESON, a citizen of the United States, and a resident of Logan, in the county of Phillips and State of Kansas, have invented new and useful Improvements in Subsoiler Attachments for Lister-Plows, of which the following is a specification.

My invention relates to subsoiler attachments for lister plows and has for its object the provision of a subsoiler that is so constructed as to run with a minimum draft; that is provided with means for attaching a cornplanter for seeding corn in the subsoil, and that has a point or lay that can be removed for sharpening and replaced in position when sharpened or by another point or lay when worn out, thus insuring that the subsoiler will always occupy the same position relative to the position of the lister.

The construction and advantages of my invention will be described in detail hereinafter and illustrated in the accompanying drawings, in which—

Figure 4:
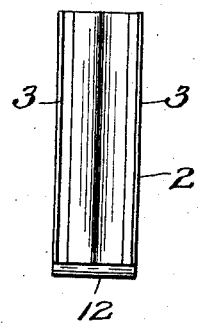
Figure 5:
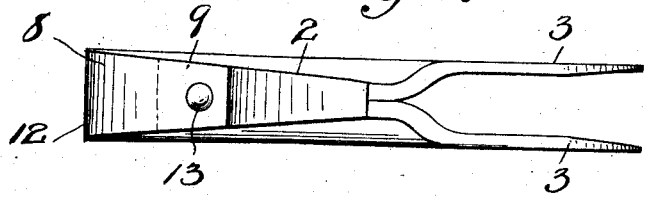

Figure 1 is a view showing a portion of a lister plow with my improved subsoiler in position thereon; Fig. 2, a side view of my subsoiler detached from the plow; Fig. 3, a front view; Fig. 4, a rear view; Fig. 5, a top view; and Fig. 6, a bottom view, and Fig. 7, a modification of my lay.

In the drawings similar reference characters indicate corresponding parts throughout the several views.

1 indicates the standard of my improved subsoiler that is secured in any suitable manner to the plow-beam A. My improved subsoiler consists of the relatively narrow blade 2, having its front portion formed solid and its rear formed with two substantially parallel wings 3, between which the lower end of the standard 1 is secured by means of countersunk bolts or rivets 4. The wings 3 extend to the rear of the standard 1 an appreciable distance to admit of the securing of the lower end of the tube 5 therein, connected with a seed box (not shown) carried by the plow for dropping seed in the furrow made by the attachment.

Figure 6:
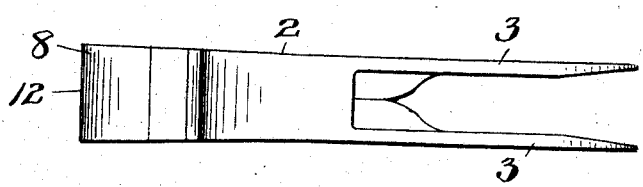
Figure 7:
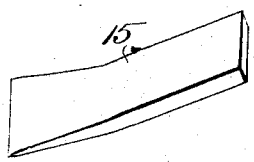

As shown in Figs. 5 and 6, the front portion or point of the blade 2 is wider than its rear portion, so that the sides of the blade frictionally engage the sides of the furrow made thereby with a minimum draft. The lower portion of the front is extended forwardly and downwardly, as shown at 6, and provided with a recess 7.

8 indicates a lay or removable point having a shank 9 to seat in recess 7, and with a shoulder 10 to engage the end of the forwardly and downwardly extended portion 6. The lower side of lay 8 extends diagonally from the edge of the shoulder 10, as shown at 11, until it intercepts the upper side of the lay, thus providing a sharp chisel point 12, pointing downwardly at an angle of substantially 30 degrees. Lay 8 is secured to blade 2 by means of countersunk bolt or rivet 13. Above the recess 7 the blade to the top thereof is flat on the same plane as the top of the lay 8, as shown at 14.

15 indicates a modification of my lay.

When in use, it will be understood that the chisel-point 12 cuts into the soil which is carried up by the top surface of the lay 8 and the flat portion or shin 14. By planting corn in the furrow made by my improved attachment it will grow slower at the start, but it will be more hardy, grow with less working, and require less surface water because of the moisture in the subsoil reached by its roots.

Having thus described my invention, what I claim is—

1. A subsoiler attachment for lister plows comprising a relatively thin blade having its rear portion bifurcated and forming two wings, the standard secured between said wings, the forward end formed with a recess, a lay having a shank to seat in said recess, and the front of the blade above the recess formed with a flat shin, substantially as shown and described.

2. A subsoiler attachment for lister plows comprising a relatively thin blade having its rear portion bifurcated and forming two rearwardly extending wings, the standard secured between said wings, the forward end formed with a downwardly-extending portion and a recess, a lay having a shank to seat in said recess and a shoulder to engage the downwardly extending portion, and the front of the blade above the recess formed with a flat shin, substantially as shown and described.

3. A subsoiler attachment for lister plows comprising a relatively thin blade wider in front than in the rear and having its rear portion bifurcated and forming two substantially parallel wings, the standard secured between said wings, the forward end formed with a downwardly extending portion and a recess, a lay having a shank to seat in said recess and a shoulder to engage the downwardly extending portion, and the front of the blade above the recess formed with a flat shin, substantially as shown and described.

In witness whereof, I have hereunto set my hand in presence of two subscribing witnesses.

GEORGE W. FERGUESON.

Witnesses:
H. P. ANDREWS,
M. S. MATHEWS.